US 6,656,385 B2

(12) United States Patent
Lynch et al.

(10) Patent No.: US 6,656,385 B2
(45) Date of Patent: Dec. 2, 2003

(54) FUNCTIONALIZED CUBIC LIQUID CRYSTALLINE PHASE MATERIALS AND METHODS FOR THEIR PREPARATION AND USE

(75) Inventors: Matthew Lawrence Lynch, Mariemont, OH (US); Patrick Thomas Spicer, Wyoming, OH (US)

(73) Assignee: The Procter & Gamble Company, Cincinnati, OH (US)

(*) Notice: Subject to any disclaimer, the term of this patent is extended or adjusted under 35 U.S.C. 154(b) by 33 days.

(21) Appl. No.: 10/056,346

(22) Filed: Jan. 25, 2002

(65) Prior Publication Data

US 2002/0158226 A1 Oct. 31, 2002

Related U.S. Application Data

(60) Provisional application No. 60/270,306, filed on Feb. 21, 2001.

(51) Int. Cl.[7] .................................................. C09K 19/34
(52) U.S. Cl. ................................. 252/299.61; 252/299.4
(58) Field of Search .................... 252/299.01, 299.1, 252/299.2, 299.3, 299.4, 299.5, 299.6, 299.61, 299.62, 299.63, 299.64, 299.65, 299.66, 299.67, 299.68, 299.7

(56) References Cited

U.S. PATENT DOCUMENTS

| | | | |
|---|---|---|---|
| 4,557,935 A | | 12/1985 | Ekenstam et al. |
| 5,196,201 A | | 3/1993 | Larsson et al. |
| 5,230,895 A | | 7/1993 | Czarnecki et al. |
| 5,531,925 A | * | 7/1996 | Landh et al. .......... 252/299.01 |
| 5,593,663 A | | 1/1997 | Leng et al. |
| 5,753,259 A | * | 5/1998 | Engstrom et al. .......... 424/450 |
| 5,756,108 A | | 5/1998 | Ribier et al. |
| 5,807,573 A | * | 9/1998 | Ljusberg-Wahren et al. .......... 424/450 |

FOREIGN PATENT DOCUMENTS

| | | |
|---|---|---|
| WO | WO 98/47487 A1 | 10/1998 |
| WO | WO 99/12640 A1 | 3/1999 |
| WO | WO 01/68139 A1 | 9/2001 |

OTHER PUBLICATIONS

J. S. Kim, et al., *Drug Formulations that Form a Dispersed Cubic Phase when Mixed with Water*, Proceed. Int'l. Symp. Control. Rel. Bioact. Mater., 27 (2000) Controlled Release Society, Inc., pp. 1118 & 1119.

R. G. Laughlin, Equilibrium vesicles: fact or fiction?, Colloids and Surfaces A: Physicochemical and Engineering Aspects 128 (1997) 27–38.

(List continued on next page.)

*Primary Examiner*—Mark F. Huff
*Assistant Examiner*—Jennifer R. Sadula
(74) *Attorney, Agent, or Firm*—Peter D. Meyer

(57) ABSTRACT

Functionalized cubic gel precursors, functionalized cubic liquid crystalline gels, dispersions of functionalized cubic gel particles, functionalized cubic gel particles, and methods of preparation and use thereof. The precursors, gels, dispersions, and particles are prepared with hydrotropes that do not detrimentally affect the cubic liquid crystalline structure of the precursors, gels, dispersions, and particles. The precursors, gels, dispersions, and particles can be used to deliver active ingredients to substrates.

20 Claims, 2 Drawing Sheets

OTHER PUBLICATIONS

J. C. Shah, *Cubic phase gels as drug delivery systems*, Advanced Drug Delivery Reviews 47 (2001) 229–250.

N. Cruise, *Letter to the Editor "Mesoporous Alumina Made from a Bicontinuous Liquid Crystalline Phase,"* Journal of Colloid and Interface Science 241, 527–529 (2001).

E. M. Landau, *Lipidic cubic phases: A novel concept for the crystallization of membrane proteins*, Proc. Natl. Acad. Sci. USA vol. 93, pp. 14532–14535. Dec. 1996.

H. Qiu, *The phase diagram of the monoolein/water system: metastability and equilibrium aspects*, Biomaterials 21 (2000) 223–224.

M. L. Lynch, *Aqueous–Phase Behavior and Cubic Phase–Containing Emulsions in the $C_{12}E_2$—Water System*, Langmuir 2000, 16, 3537–3542.

R. G. Laughlin, *An Expedient Technique for Determining Solubility Phase Boundaries in Surfactant–Water Systems*, Journal of Colloid and Interface Science, vol. 55, No. 1, pp. 239–241, Apr. 1976.

V. Luzzati, *Structure of the Cubic Phases of Lipid–Water Systems*, Nature, vol. 220, pp. 485–488, Nov. 2, 1968.

J. R. Bellare, *Controlled Environment Vitrification System: An Improved Sample Preparation Technique*, Journal of Electron Microscopy Technique, 10:87–111 (1988).

M. R. Porter, *Handbook of Surfactants*, $2^{nd}$ ed., Blackie Academic & Professional, 1994, pp. 188–236.

S. Hyde, *The Language of Shape*, Elsevier Press, NY (1997).

V. Luzzati, *Cubic Phases of lipid–containing systems*, Journal Mol. Biol., 1993, 229, 540–551.

H. G. Schnering, *Nodal surfaces of fourier series: fundamental invariants of structured matter*, Condensed Matter 83, 407–412 (1991).

G. Rummel, *Lipidic Cubic Phases: New Matrices for the three–dimensional crystallization of membrane proteins*, Journal of Structural Biology 121, 92–91 (1998).

H. Ljusberg–Wahren, *Dispersion of the cubic liquid crystalline phase–structure, preparation and functionality aspects*, Chimica Oggi, 1996,. 14, 40–43.

Norling, *Formulation of a drug delivery system based on a mixture of monoglycerides and triglycerides for use in the treatment of periodontal disease*, Journal Clin. Periodontal, 1992, 19 (9, Pt.2) 687–692.

K. Lindell, *Influence of a charged phospholipid on the release pattern of timolol maleate from cubic liquid crystalline phases*, Progr Colloid Polym Sci (1998) 108:111–118.

S. Engstrom, *Cubic phases for studies of drug partition into lipid bilayers*, European Journal of Pharmaceutical Sciences 8 (1990, 243–254.

R. G. Laughlin, *The aqueous phase behavior of surfactants*, Academic Press, NY, 1994, p. 255.

McCutcheon, *Emulsifiers & Detergents*, North American Edition, vol. 21 (1994).

* cited by examiner

FUNCTIONALIZED CUBIC LIQUID CRYSTALLINE PHASE MATERIALS AND METHODS FOR THEIR PREPARATION AND USE

CROSS REFERENCE TO RELATED APPLICATION

This application claims the benefit of U.S. Provisional Application No. 60/270,306 filed Feb. 21, 2001.

FIELD OF THE INVENTION

This invention relates to functionalized cubic liquid crystalline phases and methods for their preparation and use. More specifically, this invention relates to functionalized cubic liquid crystalline phase materials that have properties tailored to specific uses.

BACKGROUND OF THE INVENTION

Much of the interest in bicontinuous cubic phase liquid crystals is a consequence of their unique structure. They are composed of mixtures of lipid and water arranged into bilayers. The bilayers, in turn, are twisted into a periodic, three-dimension structure that minimizes the energy associated with bending the bilayers (i.e. minimize curvature energy). See Hyde, S., Andersson, S., Larrson, K., Blum, Z., Landh, T., Lidin, S., Ninham, B. W., *The Language of Shape*, Elsevier Press, New York, 1997. These structures are 'honeycombed' with bicontinuous domains of water and lipid that is reminiscent of an organic zeolite or highly-structured microemulsion. As such the structure can simultaneously accommodate water-soluble, lipid-soluble and amphiphilic molecules and provide pathways for diffusion of water-soluble and lipid-soluble materials. While there have been a number of proposed cubic phases, there are three recognized bicontinuous liquid crystals structures: $P_{n3m}$ (D-surface), $I_{a3d}$ (G-surface), and $I_{m3m}$ (P-surface). See Luzzati, V., Vargas, R., Mariani, P., Gulik, A., Delacroix, H., *J. Mol. Biol.*, 1993, 229, 540–551. These structures can be difficult to express in rigorous mathematical terms. However, if expressed in terms of nodal surfaces, structure and shape can be approximated. See von Schnering, H. G., Nesper, R. Z., *Phys. B-Condensed Matter*, 1991, 83, 407–412. The phase behavior of a broad range of monoglycerides has been documented and modifications to the phase behavior have been defined. See Qiu, H., Caffrey, M., "The phase diagram of the monoolein/water system: metastability and equilibrium aspects", *Biomaterials*, 1999, 21(3), 223–234. Accordingly, monoolein-based bicontinuous cubic liquid crystal phase have good temperature stability, high internal surface area, gel-like viscosity, relative insensitivity to salt and solvent compositions, and use low cost raw materials which make them practical for commercial applications. Monoolein naturally exhibits $P_{n3m}$ and $I_{a3d}$, with $I_{m3m}$ present with the addition of proteins. See Rummel, G., Hardmeyer, A., Widmer, C., Chiu, M. L., Nollert, P., Locher, K. P., Pedruzzi, I., Landau, E. M., Rosenbusch, J. P., *J. Structural Biology*, 1998, 121, 82–91.

Cubic phase liquid crystals have been used in gel, dispersion and precursor form. 'Gels' are mixtures that contain a majority of the cubic phase liquid crystal. It is common for either mixture to exclusively contain cubic liquid crystal phase. Applications for these gels can range from drug delivery vehicles (See Shah, J. C., Sadhale, Y., Chilukuri, D. M., *Adv. Drug Delivery Rev.*, 2001, 47(2–3), 229–250), to a matrix in which membrane proteins can be crystallized (See Landau, E., Rosenbusch, J., *Proc. Natl. Acad. Sci. USA.*, 1996, 93(25), 14532–14535), or in which mesoporous nanoparticles can be formed (See Cruise, N., Jansson, K., Holmberg, K., *J. Colloid Interface Sci.*, 2001, 241(2), 527–529).

Nielsen, WO 98/47487, discloses compositions of bioadhesive liquid crystal gels, including the cubic phase liquid crystals and precursors. Compostions include an active, a cubic phase forming lipid, and a structurant that is added without changing the structure of the liquid crystal. These compositions do not disclose the use of hydrotropes to form liquid crystals.

Engstrom et al., U.S. Pat. No. 5,753,259, discloses a composition and method of use of liquid crystal gels, including cubic phase liquid crystals, for controlled release applications. The disclosed gels are fabricated from a mixture of lipid, solvent, and bioactive materials including nucleic acids. However, these gel compositions do not utilize hydrotropes.

'Dispersions' are particles of cubic liquid crystalline phase material that are often submicron in size. Particles are generally dispersed in a liquid medium and are often termed Cubosomes. Cavitating a mixture of lipid and liquid generally makes dispersions of cubic phase liquid crystals. This requires high pressures and numerous passes before homogeneous nanoparticle dispersions are produced (See Ljusberg-Wahren, H., Nyberg, L., Larsson, K., *Chimica Oggi*, 1996, 14, 40–43). Cubosomes have distinct practical advantages over vesicles and liposomes because cubosomes are an equilibrium phase (See Laughlin, R. G. *Colloids and Surfaces A*, 1997, 128, 27–38). Cubosomes also possess much greater internal surface area than vesicles or liposomes and are more resilient against degradation.

Anderson, WO 99/12640, and Landh et al., U.S. Pat. No. 5,531,925, disclose cubic phase compositions and preparations for delivery and uptake of active agents. The particles comprise a center containing liquid crystalline or liquid material and an exterior of solid particulate. The composition of the liquids comprise a lipid and polar solvent without the sue of hydrotropes.

'Precursors' are mixtures that are not cubic phase liquid crystals but form cubic phase liquid crystals as a consequence of a stimulus. Precursors can be used to dispense a mixture in a form that readily flows, but spontaneously converts to a more viscous liquid crystal with the stimulus at a target location. This is applicable to treatments for periodontal disease (See Norling, Tomas, Lading, Pia, Engstroem, Sven, Larsson, Kare, Krog, Niels, Nissen, Soeren Soe, *J. Clin. Periodontol*, 1992, 19(9, Pt. 2), 687–92. Larson et al., U.S. Pat. No. 5,196,201, discloses the preparation and composition of precursors used as implants to treat aliments such as the repair of bone tissue. These precursors are composed of a water-based liquid, lipid, and optionally a triglyceride mixed to form a more concentrated L2 or D phase, which flows more readily, and converts to cubic phase upon the addition of water. Leng et al., U.S. Pat. No. 5,593,663, discloses combinations and preparations of antiperspirant, which uptake sweat upon application to form a viscous liquid crystalline phase, including cubic phase. However, neither of these materials contains functionalization materials.

Cubic liquid crystalline phase materials are limited in use due to restriction of their natural, or unmodified, properties. For example, the natural properties of cubic phases limit the ability to solubilize active ingredients. In fact, broad classes of actives do not effectively load (or subsequently release) because the cubic phase lacks specific interaction with the loaded active. If the active is modified to effectively load in the cubic phase, it may lose its effectiveness. Further, there are no commercially convenient ways to provide specific targeting or enhanced deposition of actives from cubic phase. Finally, there are no cubic phases suitable for 'on demand' applications. "On demand' refers to changes in the properties of cubic phase as a consequence of some stimulus, such as change in pH. As a result, a technique is needed to modify the cubic phase and significantly increase the utility of cubic phase.

SUMMARY OF THE INVENTION

A cubic liquid crystalline phase precursor comprising (A) a hydrotrope, (B) an amphiphile capable of forming a cubic liquid crystalline phase, (C) an optional solvent, and (D) an additive selected from the group consisting of an anchor, a tether, and combinations thereof, wherein ingredients (A), (B), (C), and (D) are present in mass fractions relative to each other such that $1.0 = a+b+c+d$, wherein a is the mass fraction of ingredient (A), b is the mass fraction of ingredient (B), c is the mass fraction of ingredient (C), and d is the mass fraction of ingredient (D), and wherein $1.0 > a > 0$, $1.0 > b > 0$, $1.0 > c \geq 0$, $1.0 > d > 0$; and with the proviso that a, b, c, and d do not fall within a cubic liquid crystalline phase region on a phase diagram representing phase behavior of ingredients (A), (B), (C), and (D).

A bulk cubic liquid crystalline gel comprising (A) a hydrotrope, (B) an amphiphile capable of forming a cubic liquid crystalline phase, (C) a solvent, and (D) an additive selected from the group consisting of an anchor, a tether, and combinations thereof, wherein ingredients (A), (B), (C), and (D) are present in mass fractions relative to each other such that $1.0 = a+b+c+d$, wherein a is the mass fraction of ingredient (A), b is the mass fraction of ingredient (B), c is the mass fraction of ingredient (C), and d is the mass fraction of ingredient (D), and wherein $1.0 > a > 0$, $1.0 > b > 0$, $1.0 > c > 0$, $1.0 > d > 0$; and with the proviso that a, b, c, and d fall within a cubic liquid crystalline phase region on a phase diagram representing phase behavior of ingredients (A), (B), (C), and (D).

A disperison of cubic liquid crystalline gel particles comprising (A) a hydrotrope, (B) an amphiphile capable of forming a cubic liquid crystalline phase, (C) a solvent, and (D) an additive selected from the group consisting of an anchor, a tether, and combinations thereof, wherein ingredients (A), (B), (C), and (D) are present in mass fractions relative to each other such that $1.0 = a+b+c+d$, wherein a is the mass fraction of ingredient (A), b is the mass fraction of ingredient (B), c is the mass fraction of ingredient (C), and d is the mass fraction of ingredient (D), and wherein $1.0 > a > 0$, $1.0 > b > 0$, $1.0 > c > 0$, $1.0 > d > 0$; and with the proviso that a, b, c, and d fall within a region representing cubic liquid crystalline phase in combination with at least one other phase on a phase diagram representing phase behavior of ingredients (A), (B), (C), and (D), with the proviso that the dispersion has a form of functionalized cubic liquid crystalline gel particles dispersed in the other phase.

DETAILED DESCRIPTION OF THE INVENTION

Figure 1:
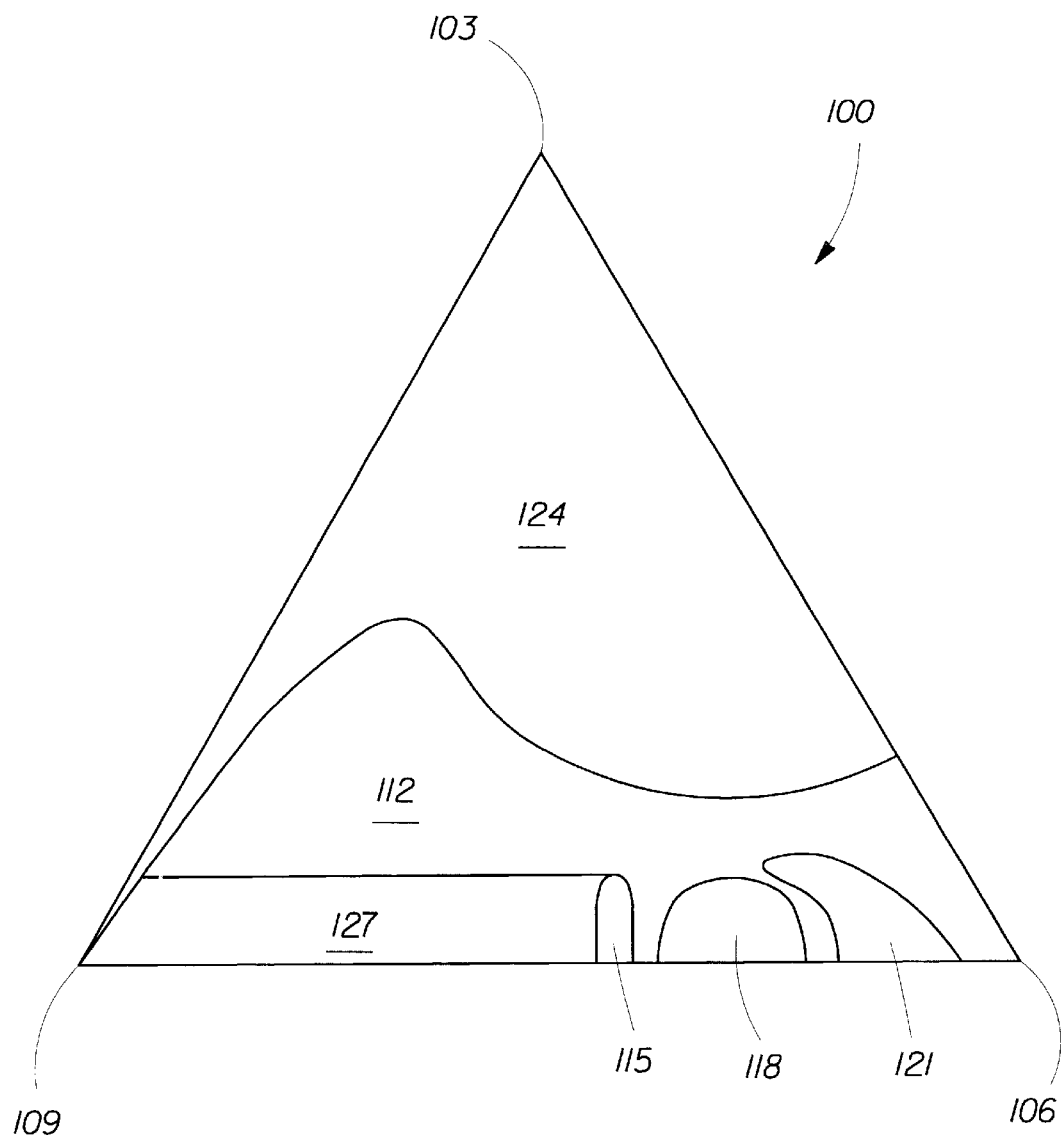
FIG. 1 is a phase diagram representing the behavior of composition containing a hydrotrope, a combination of amphiphile and additive, and a solvent.

This invention relates to precursors, bulk cubic liquid crystalline gels, dispersions of cubic liquid crystalline gel particles, cubic liquid crystalline gel particles, and combinations thereof. All percentages, ratios, and proportions used herein are by weight unless otherwise specified. All measurements are made at 25° C., unless otherwise specified. All U.S. patents and printed publications cited are herein incorporated by reference.

Definition and Usage of Terms

"Amphiphile" means a molecule with both hydrophilic and hydrophobic (lipophilic) groups (e.g, surfactants, lipids, and polymers).

"Anchor" means a small molecule, including surfactants that have a lipid-soluble 'tail' with a water-soluble 'head'. Without wishing to be bound by theory, it is thought that the role of the lipid-soluble tail is to dissolve into the bilayers of the cubic phase, and the role of the water-soluble head might be to provide a specific (or tailored) interaction such as an electrostatic or hydrogen bond with the materials of interest.

"Bulk cubic gel" means a viscous, structurally isotropic gel (clear, translucent, or opaque) having a normal, or reversed, cubic liquid crystalline structure, with a composition matching a cubic liquid crystalline region of a phase diagram representing the phase behavior of ingredients in the composition. Bulk cubic gel is also referred to herein as bulk cubic liquid crystalline gel.

"Colloidally stable" means that when cubic gel particles are dispersed in a solvent, the particles do not coalesce, flocculate, or agglomerate over some reasonable time.

"Cubic gel particles" means the dispersed form of bulk cubic gel; technically they are cubic liquid crystalline gel in equilibrium with either the solvent, isotropic liquid phase, lamellar phase, or a combination of two of these. Cubic gel particles are also referred to herein as cubic liquid crystalline gel particles.

"Cubic liquid crystalline phase material" means a composition that falls within a cubic liquid crystalline phase region on a phase diagram for the ingredients in the composition or a composition that falls within a region on the phase diagram where cubic liquid crystalline phase is in equilibrium with another phase. Cubic liquid crystalline phase material includes bulk cubic gels, cubic gel particles, and dispersions of cubic gel particles.

"Cuboplex" means a functionalized cubic liquid crystalline phase material according to this invention.

"Gel" means a Theologically semisolid system. Gel includes cubic liquid crystalline materials such as bulk cubic gels and dispersions of cubic gel particles.

"Hydrotrope" means a surfactant-type molecule (comprising at least one hydrophilic group and at least one hydrophobic group), wherein the molecule has too short or too soluble a hydrophobic group or too insoluble or too large a hydrophilic group to display surfactant phase behavior. Hydrotropes are highly soluble in water and do not form aggregates in solution (e.g., micelles). Hydrotropes dissolve amphiphiles. Hydrotropes do not prevent formation of a cubic liquid crystalline phase upon dilution of a mixture of the hydrotrope and amphiphile with a solvent. The hydrotropes enhance the miscibility of weakly polar and otherwise water-insoluble molecules (such as monoolein) with aqueous solutions; this effect is commonly known as "salting-in". The hydrotrope is typically present in a substantial concentration (i.e., 1% or more) to display the hydrotropic properties described above.

"L1" means a dilute liquid phase.

"L2" means a concentrated liquid phase.

"Lipid" means any amphiphilic molecule of intermediate molecular weight that contains a substantial portion of aliphatic or aromatic hydrocarbon.

"Paste" means a liquid for topical application, preferably to the skin of an animal (preferably a human), whose viscosity is enhanced to the point that flow is largely inhibited by the presence of undissolved, as well as dissolved, solids.

"Precursor" means a formulation that will form a cubic liquid crystalline phase material upon action by a stimulus. The stimulus can be the addition of some specified material such as additional hydrotrope, amphiphile, or solvent; the removal of some specified material such as a portion of the hydrotrope, amphiphile, or solvent; a temperature change; a pressure change; addition of salt; or a pH change in aqueous systems.

"Stabilizer" means an agent that prevents aggregation, coalescence, and flocculation of dispersed phase particles. Stabilizers impart colloidal stability to dispersed cubic gel particles. Stabilizers include small particulates that absorb upon surfaces of the particles, ionic materials, polymers, charged lipids, surfactants, and liquid crystalline phase adsorbed to the surfaces of the particles.

"Surfactant" means an amphiphile that exhibits the following properties in water: (1) it reduces the interfacial tension, and (2) it self-assembles in solution at low concentrations.

"Tether" means a molecule larger than an anchor, including modified polymers, proteins, and enzymes that have a lipid-soluble fragment and a water-soluble fragment. Without wishing to be bound by theory, it is thought that the role of the lipid-soluble fragment is to dissolve into the bilayers of the cubic phase, and the role of the water-soluble fragment might be to provide a specific (or tailored) interaction such as an electrostatic or hydrogen bond with the materials of interest. Tethers.

"Thermodynamically stable" means that a system is at its lowest energy state or a system that is kinetically trapped in the same state for some reasonable time.

Precursor

The precursor generally can comprise a hydrotrope, an amphiphile capable of forming a cubic liquid crystalline phase, an optional solvent, and an additive selected from the group consisting of anchors, tethers, and/or combinations thereof. The precursor can optionally comprise an active ingredient.

Hydrotrope

The hydrotrope can be a single hydrotrope or a combination of two or more hydrotropes capable of dissolving an amphiphile and allow formation of cubic gel particles dispersed in isotropic liquid phases. Preferably, the hydrotrope does not prevent formation of a cubic liquid crystalline phase upon sufficient dilution of a mixture of the hydrotrope and amphiphile with a solvent. The hydrotrope can function as a process aid to dissolve an amphiphile and eliminate solids handling in processes to make precursors, gels, dispersions, and other particles of this invention. The hydrotrope can also prevent an additive from crystallizing and increase the amount of additive that can be added to a precursor, gel, dispersion, and/or particle. Without wishing to be bound by theory, it is believed that the hydrotrope should have sufficient hydrophilic character for cubic liquid crystalline phase to form when the hydrotrope is present in amounts up to about 10%.

Exemplary, but non-limiting, hydrotropes include alcohols, polyols, alcohol ethoxylates, surfactants derived from mono- and poly-saccharides, copolymers of ethylene and propylene oxide, fatty acid ethoxylates, sorbitan derivatives, sodium butyrate, nicotinamide, procaine hydrogen chloride, ethylene glycol, propylene glycol, glycerol, and polyglyceryl esters, the ethoxylated derivatives thereof, and combinations thereof. Exemplary hydrotropes include methanol, ethanol, 1,4-butanediol, 1,2-hexanediol, sodium butyrate, nicotinamide, and procaine hydrogen chloride.

A suitable hydrotrope is determined by preparation of a composition comprising the proposed hydrotrope, an amphiphile, and a solvent. A hydrotrope can be suitable if the composition forms a cubic phase or cubic phase in combination with another phase. A preferred hydrotrope composition forms a cubic phase or cubic phase in combination with an isotropic liquid.

Polarized light microscopy (PLM) can be used to determine whether the composition formed cubic phase. PLM can be carried out on a polarized light microscope or constructed light box, as described by Laughlin, R. G., *J. Colloid Interface Sci.*, 55, 239–242 (1976). L1, L2, L3, and cubic phases show no birefringence and appear dark. Cubic phases are very viscous while the other phases (i.e., L1, L2, and L3) are less viscous, like water. Therefore, it is believed that a lack of birefringence in combination with bulk, solid-like Theological properties indicates the presence of cubic phase.

Amphiphile

The amphiphile can be a single amphiphile or a combination (e.g., mixture) of two or more amphiphiles capable of forming a cubic liquid crystalline phase. Preferably, amphiphiles are surfactants capable of forming cubic liquid crystalline phases in the presence of a hydrotrope, solvent, and additive. Suitable hydrophilic groups and methods for the selection of suitable hydrophilic groups, are disclosed in Laughlin, R. G., *The Aqueous Phase Behavior of Surfactants*, Academic Press, New York, 1994, pg. 255, and International Patent Publication WO 99/12640. Non-limiting examples of suitable amphiphiles are excerpted in Tables 1–5 below.

TABLE 1

Anionic Hydrophilic Groups

| Functional Group | General Formula |
|---|---|
| Alkyl carboxylate salts | $R'CO_2^-M^+$ |
| Alkanesulfonate salts | $R'SO_3^-,M^+$ |
| Alkyl sulfate salts | $R'OSO_3^-,M^+$ |
| N-Alkylsulfamate salts | $R'NHSO_3^-,M^+$ |
| Akylsulfinate salts | $R'SO_2^-,M^+$ |
| S-Alkylthiosulfate salts | $R'SSO_3^-,M^+$ |
| Phosphonate salts | $R'PO_3^{=},2M^+$ |
| Phosphate monoester salts | $R'OPO_4^{=},2M^+$ |
| Phosphinate salts | $R'(R')PO_2^-,M^+$ |
| Nitroamide salts | $R'N^-NO_2,M^+$ |
| Trisulfonylmethide salts | $R'SO_2(CH_3SO_2)_2C^-,M^+$ |
| Xanthate salts | $R'SCS_2^-,M^+$ |
| Phosphate diesters | |

TABLE 2

Cationic Hydrophilic Groups

| Functional Group | General Formula |
|---|---|
| Quaternary ammonium salts | $R'N^+(CH_3)_3,X^-$ |
| Primary, secondary, and tertiary ammonium salts | $R'N^+H_m(CH_3)_{3-m}, X^-$ |
| N-alkylpyridinium salts | $R'NC_5H_5^+,X^-$ |
| Quaternary phosphonium salts | $R'P^+(CH_3)_3,X^-$ |
| Ternary sulfonium salts | $R'S^+(CH_3)_2,X^-$ |
| Ternary sulfoxonium salts | $R'S^+(\rightarrow O)(CH_3)_2,X^-$ |
| Bis(phosphoranylidyl)ammonium salts | $[R'(CH_3)_3P \rightarrow N \leftarrow P(CH_3)_3R']^+,X^-$ |

TABLE 3

Zwitterionic Hydrophilic Groups

| Functional Group | General Formula |
| --- | --- |
| Ammonioacetates | $R'(CH_3)_2N^+CH_2CO_2^-$ |
| Ammonio hexanoates | $R'(CH_3)_2N^+(CH_2)_5CO_2^-$ |
| Ammonio alkanesulfonates | $R'(CH_3)_2N^+(CH_2)_3SO_3^-$ |
| Ammonioalkyl sulfates | $R'(CH_3)_2N^+(CH_2)NOSO_3^-$ |
| Trimethylammonioethyl alkylphosphonates | $R'PO_2^-OCH_2CH_2N^+(CH_3)_3$ |
| Trimethylammonioethylphosphate acylglyceryl esters | $R'CO_2CH_2CH(OH)CH_2OPO_2^-O(CH_2)_2N^+(CH_3)_3$ |

TABLE 4

Dipolar Hydrophilic Groups

| Functional Group | General Formula |
| --- | --- |
| Aliphatic amine oxides | $R'(CH_3)_2N{\rightarrow}O$ |
| Phosphine oxides | $R'(CH_3)_2P{\rightarrow}O$ |
| Phosphonate esters | $R'(CH_3O)_2P{\rightarrow}O$ |
| Phosphate esters | $R'O(CH_3O)_2P{\rightarrow}O$ |
| Arsine oxides | $R'(CH_3)_2As{\rightarrow}O$ |
| Sulfoxides | $R'(CH_3)S{\rightarrow}O$ |
| Sulfoximines | $R'(CH_3)S({\rightarrow}O){\rightarrow}NH$ |
| Sulfone diimines | $R'(CH_3)S({\rightarrow}NH)_2$ |
| Ammonioamidates | $R'C(O)N{-}N{+}(CH_3)_3$ |
| Amides | $R'C(O)N(CH_3)_2$ |

TABLE 5

Single Bond Hydrophilic Groups

| Functional Group | General Formula |
| --- | --- |
| Primary Amines | $R'NH_2$ |

In Tables 1–5, R' represents a hydrocarbon group, preferably an alkyl group. M represents a metal atom. The subscript m is 1, 2, or 3. X represents a halogen atom.

Exemplary, but non-limiting, lipophilic groups include monovalent hydrocarbon groups, substituted monovalent hydrocarbon groups, surfactants, and siloxanes. Suitable monovalent hydrocarbon groups have 6 to 22 carbon atoms, preferably 8 to 22 carbon atoms, more preferably 10 to 18 carbon atoms. Substituted monovalent hydrocarbon group include halogenated monovalent hydrocarbon groups, typically having 6 to 22 carbon atoms. The monovalent hydrocarbon groups and substituted monovalent hydrocarbon groups can be saturated or unsaturated, branched or unbranched. Preferred branched hydrocarbon groups typically have 8 to 22 carbon atoms. Preferred linear hydrocarbon groups have 8 to 18 carbon atoms.

It is preferred that an amphiphile include surfactants having HLB values of about 2.1 to about 4.6. See Porter, M. R., *Handbook of Surfactants*, 2$^{nd}$ ed., Blackie Academic & Professional, pp. 188–236. Suitable monoglyceride should have sufficient purity to form cubic liquid crystalline phase in combination with solvent and the hydrotrope. A monoglyceride is typically greater than about 40% to 100% pure, preferably about 82.5 to 100% pure, however, a purity of less than about 40% may also be suitable.

A class of preferred surfactants includes monoglycerides having the general formula:

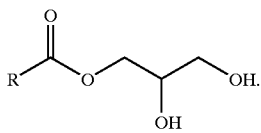

R is selected from the group consisting of monovalent hydrocarbon groups of 6 to 22 carbon atoms, preferably 8 to 22 carbon atoms, more preferably 10 to 18 carbon atoms, and monovalent halogenated hydrocarbon groups of 6 to 22 carbon atoms. The monovalent hydrocarbon groups can be saturated or unsaturated, branched or unbranched. Preferred branched hydrocarbon groups typically have 8 to 22 carbon atoms. Preferred linear hydrocarbon groups have 8 to 18 carbon atoms. Preferred monoglycerides have a melting point $\geq 40°$ C. International Patent Publication No. WO 99/12640 discloses suitable amphiphiles that can form cubic liquid crystalline phase.

Exemplary amphiphiles are disclosed in U.S. Pat. No. 5,756,108 and include 3,7,11,15-tetramethyl-1,2,3-hexadecanetriol, phytanetriol, N-2-alkoxycarbonyl derivatives of N-methylglucamine, and unsaturated fatty acid monoglycerides, monoglyceride surfactants such as glycerol monooleate (HLB of 3.8), glycerol monostearate (HLB 3.4), ethoxylated alcohol surfactants such as $C_{12}EO_2$, $C_{12}EO_{23}$, and $C_{16}EO_3$, wherein EO represent an ethylene oxide group, (See Lynch et al., "Aqueous Phase Behavior and Cubic Phase-Containing Emulsions in the C12E2-Water System," *Langmuir*, Vol. 16, No. 7, pp. 3537–3542 (2000)), monolinolein, and combinations thereof.

Other suitable amphiphiles can include amphoteric surfactants such as betaines, glycinates, amino propionates, and combinations thereof. Additional suitable amphiphiles include lipids of biological origin such as fatty acids, acyl glycerols, glycerolphospholipids, phosphatidic acid (and salts thereof), phosphatidylethanolamine, phosphatidylcholine (lecithin), phosphatidylserine, phosphatidyllinositol, phosphatidylethanolamine, spingolipids (Ceramides), spingomyelin, cerebroside, glucocerebroside, ganglioside, steriods, cholesterol esters (stearates, etc.), sugar-based surfactants, glucolipids, galactolipids, and combinations thereof.

Solvent

The solvent can be a single solvent or a combination of two or more polar or non-polar solvents and may contain other ingredients, such as buffers and/or stabilizers. Exemplary, but non-limiting, polar solvents include water, glycerol, polyglycols such as polyethylene glycol, formamides such as formamide, n-methyl formamide and dimethylformamide, ethylammonium nitrate, and combinations thereof. Exemplary, but non-limiting, nonpolar solvents include aliphatic hydrocarbons, such as alkanes and fatty esters such as lanolin, and substituted hydrocarbons, such as halogenated hydrocarbons.

Additives

Generally, the additive is an anchor, a tether, and/or a combination thereof having a low Krafft temperature, preferably below about 25° C. to prevent crystallization. Most preferably, the anchors are selected from the group consisting of positive charged surfactants and negative charged surfactants. Examples of suitable surfactants can be found in McCutcheon, *Emulsifiers & Detergents*, North American Edition, vol. 1 (1994). Preferred positive charged surfactants include dioctyldecylamine hydrogen chloride. Preferred negative charged surfactants include potassium oleate. Tethers are preferably selected from the group consisting of derivatized polysaccharides and linear substituted polymers. However, the exact choice of anchor and/or tether depends on various factors including the intended use of the precursor, gel, dispersion, or particles incorporating said anchor and/or tether and any active ingredients that will be added.

There are at least two types of tethers. One type can be thought of as a large surfactant, for example,

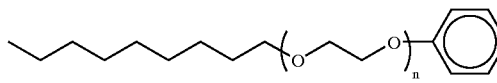

in which one end of the molecule is a lipid-soluble fragment or chain and at the other end is the added water-soluble fragment for specific functionality. A large polymeric spacer or backbone can separate these groups.

Another tether introduces a lipid-soluble fragment (e.g. aliphatic chain) that can attach to the bilayer with a water-soluble polymeric fragment that has multiple site for interaction, for example, a polydentate ligand such as:

The image shows an examplary charge peptide fragment that can be anchored to the bilayer (Lys=Lysine). A comparable situation can exist with polymers where Lysine is replaced with polyvinyl alcohol (PVA), as shown below. It would also be possible to relace Lysine with polyvinyl alcohol (PVA), for example:

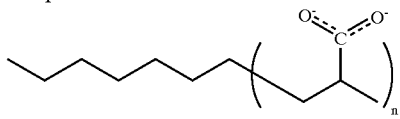

where n is an integer from about 1 to about 50.

Preferred tethers are linear, branched, block copolymers, random copolymers, or grafted copolymers. Exemplary monomers (in mono- or co-polymer applications), anchors, and tethers are tabulated in Table 6. Alternatively, surfactants containing the hydrophilic groups in Tables 3 and 4, above may be used as a tether or active when they are not being used as an amphiphile.

Preferably, the additive has a hydrophobic chain length matching the hydrophobic domain of the cubic phase to improve the effective solubility in the bilayer of the cubic phase. Further, the additive can have minimal solubility in the solvent to ensure that the additive is associated with the cubic phase rather than partitioned into the solvent. In the case of anchors, di-chain over mono-chain surfactants and lipids are preferred. In the case of a tether, a higher solvent solubility may be required than for a corresponding anchor due to potential multiple molecular attachment sites. Charged-head group surfactants, lipids, and polymers are used when desiring pH, solvent or ionic strength-triggered formulations. Additionally, additives can be selected using rules of electrostatics and hydrogen bonding, for example, selecting an additive to have an electrostatic interaction with a target such as another active ingredient. However, it can be generally preferable to maximize the charge on anchor or tether. This can be changed by eliminating the point charge, for example, by protonating a carboxylate. Further, any dielectric constant of the medium can vary according to the need. The addition of salt can increase the dielectric constant of the solution, decreasing the interaction between materials. Therefore, it is believed to be preferable to get the materials as close as possible to maximize the interactions. Additionally, presence of a hydrotrope in an additive can prevent additives from crystallizing and can allow the amount of additive to be increased or broaden the range of additives that can be used.

In another embodiment, the additive can be selected to hydrogen bond with a target, for example, an active ingredient. Ethylene oxide based head group surfactants, lipids, and polymers can be used when desiring temperature-triggered 'on-demand' formulation.

TABLE 6

Examples of Additives

| Anchors | Tethers |
|---|---|
| Positive-Charged Surfactants | Derivatized-Polysaccharides |
| Quaternary (preferably di-chain) | Cellulose-Derivatives |
| Imidazoline-based | Hydrophobically-Modified |
| Substituted amino acids (appropriate pH) | Cellulose Esters (e.g. Emulsan) |
| | Ethylene-oxide substituted |
| Negative-Charged Surfactants | Chitin-Derivatives |
| Alkyl carboxylates (e.g. oleate) | Starch-Derivatives |
| Modified carboxylates | Glycogen |
| Isethionates | Glycoaminoglycans |
| Phosphate Esters (mono- and di-phosphate) | Keratin Sulfate |
| | Dermatan Sulfate |
| Alkyl sulphates | Glycoproteins |
| Sulphonates | Lignan-based polymers |
| Alkyl sulphonates | Linear-Substituted Polymers |
| Olefin sulphonates | Vinyl Polymer |
| Alkyl benzene sulphonates | Poly(acrylic acid) |
| Sulphosuccinates | Poly(acrylamide) |
| Gemini-type surfactants | Polyamine |
| | Poly(ethylene imine) |
| | Polyamide |
| | Polyisocyanate |
| | Polyester |
| | Polyphosphonate |
| | Poly-siloxanes |
| | Poly-carbonates |
| | Polyethoxylates |
| | Poloxamers |
| | Star Polymers (Dendrimers) |
| | Polypeptides |
| | poly-lysine |
| | lipo-proteins |

Active Ingredients

The precursor described above may further comprise an active ingredient (active). An active may be one active or a combination of two or more actives. The active can be added in amounts such that bulk cubic gel made from the precursor will contain up to about 15% of active, preferably about 1 to abut 10% of active wt/wt of gel.

The active can be an agrochemical such as water and non-water soluble pesticides and herbicides. Pesticides and herbicides may be incorporated into the ternary system as an active ingredient with hydrotropic properties or as an active ingredient separate from the hydrotrope. Exemplary, and non-limiting, pesticides include organophosphates such as diazinon and non-organophosphates such as diclofop-methyl, terrazole, vinclozolin, atrazine, oxamyl propargite, and triallate. Exemplary, and non-limiting, herbicides include atrazine, nicosulfuron, carfentrazone, imazapyr, benefin, and acifluorfen.

The active ingredient can be a pharmaceutical or cosmetic compound such as a non-steroidal anti-inflammatory (e.g., ketoprofen), metronidazole, acetyl salicylic acid, clotrimazole, insulin, lidocaine, hydrochloride, nitroglycerin, prilocaine, tetracycline hydrochloride, benzylpenicillin, acyclovir, guaifenesin, melatonin, metronidazole, phenylpropanolamine, pseudophedrine hydrochloride, timolol maleate, acyclovir, hydrocortisone, minoxidil (Rogaine), sildenafil citrate (Viagra), eflornithine HCl (Vaniqua), zinc pyrithione, a skin moisturizer, and combinations thereof. The active ingredient can also be an enzyme or a nutrient such as a vitamin or mineral, such as vitamin E, C, Zinc, or Iron.

FIG. represents a ternary phase diagram 100 of a system of a hydrotrope 103, a combination of an amphiphile an additive 106, and a solvent 109. Single phases (other than cubic phases) can be used as a precursor. For example, compositions falling in the single phase regions of the phase diagram, such as the isotropic liquid region 124 and the lamellar region 121, are suitable precursors. Compositions falling in the multiple phase region 112 wherein cubic phase does not form are also suitable as precursors. Compositions that do not fall in the Pn3m cubic phase region 115 and the Ia3d cubic phase region 118 are suitable precursors as discussed in Luzzati et al., *J. Mol. Biol.*, 229, 540–551 (1993).

A precursor can be used in an application where cubic phase formation is desired under a certain set of conditions, for example, the presence of sweat, saliva, or other material that will change the system composition such that it is in the area surrounding either of the two cubic phases 115, 118 or within the two cubic phases 115, 118. The precursor of this invention may be used to directly form either bulk cubic gel, dispersed cubic gel particles, or a combination of the two, all depending on the desires of the formulator.

Bulk Cubic Gel and Dispersions

In FIG. 1, dispersions should fall within the region representing cubic liquid crystalline phase in combination with another phase 127 on the phase diagram 100. Therefore, the mass fractions of (A), (B), (C), and (D) in the bulk cubic gel preferably follow the relationship of $0.1 \geq a > 0$, $0.8 \geq b > 0$, $0.4 \geq c > 0$, and $0.1 \geq d > 0$, more preferably, $0.1 \geq a > 0, 0.1 \geq b > 0$, $0.95 \geq c > 0$, and $0.1 \geq d > 0$.

(A), (B), (C), and (D) are described supra. However, the amounts of (A), (B), (C), and (D) differ so that either a bulk cubic gel or a cubic liquid crystalline gel dispersion forms. In the case of a bulk cubic gel, the amount of each ingredient should be such that the combined ingredients form a cubic liquid crystalline phase or a cubic liquid crystalline phase in combination with one or more other phases. Without wishing to be bound by theory, it is believed that a combination of the amounts of the ingredients that fall within the cubic liquid crystalline region in the phase diagram will be suitable for this invention. Referring to FIG. 1, the amount of solvent 109, hydrotrope 103, and combination of amphiphile and additive 106, should fall in one of the cubic phase regions 115, 118 in the phase diagram. Additionally, an active can be added to the bulk cubic gel.

Methods for Preparing Precursors and Functionalized Cubic Phase Materials

Precursor

A method for the preparation of a precursor comprises 1) combining an amphiphile capable of forming a cubic liquid crystalline phase with an optional hydrotrope, 2) adding an additive selected from the group consisting of an anchor, a tether, and combinations thereof, and 3) optionally adding a solvent.

In step 1), the hydrotrope and amphiphile are combined. When the amphiphile is a liquid, the hydrotrope and amphiphile can be combined by mixing. When the amphiphile is a solid, such as monoolein, the hydrotrope and amphiphile are preferably combined by heating the amphiphile beyond its melting point and then combining the melted amphiphile with hydrotrope. Alternatively, the amphiphile can be fragmented into solid particles and combined with hydrotrope. Optionally, the hydrotrope can be dissolved in an aqueous hydrotrope solution, and the solution combined with the amphiphile in step 1).

Steps 2) and 3) can be carried out any time during the method. The product of step 2) can contain amounts of (A), (B), (C), and (D) corresponding to any region on the relevant phase diagram where cubic phase does not form. Preferably, the product of step 3) is an isotropic liquid at 25° C.

The method may further comprise adding an active at any time as described supra. The amount of active can be sufficient when a gel formed from the precursor contains up to about 15%, preferably from about 0 to about 10 percent wt/wt of the combined weights of (A), (B), (C), and (D).

Bulk Cubic Liquid Crystalline Gel

Bulk cubic liquid crystalline gel can be prepared by applying a stimulus to the prepared precursor. Non-limiting stimuli include temperature changes, pressure changes, addition of a salt, a pH change, addition of a specified material such as additional hydrotrope, amphiphile, or solvent, removal of a specified material such as a portion of the hydrotrope, amphiphile, or solvent, and combinations thereof.

The precursor can be diluted, for example, by mixing the precursor with additional (A) hydrotrope, (B) amphiphile, or (C) solvent. A bulk cubic liquid crystalline gel can be prepared directly by combining amounts of ingredients (A), (B), (C), and (D) corresponding to a cubic phase region on the relevant phase diagram. After formation of the bulk cubic liquid crystalline gel has been completed, all or a portion of the hydrotrope may be removed.

Dispersed Cubic Liquid Crystalline Gel Particles

Dispersed cubic liquid crystalline gel particles can be prepared from bulk cubic gels or directly from at least one precursor.

A dispersion can be prepared directly from at least one precursor by 1) a dispersing step selected from the group consisting of a) dispersing the precursor described above in a solvent, and b) dispersing solvent in the precursor and thereafter diluting; and 2) optionally stabilizing the product of step 1).

Steps a) and b) may be performed by applying fluid shear such as in a shear mill, applying ultrasonic waves, extruding through a small pore membrane (membrane emulsification), cross membrane emulsification, impinging a stream of the precursor and a stream of solvent from opposing jets, using a static mixer, or combining streams of solvent and the precursor in a micro-mixer that utilizes either laminar or turbulent shear flow conditions to disperse the streams. The precursor may also be contacted with a solvent by spraying a fine mist of the precursor into an environment comprising solvent vapors. A spray allows the formation of droplets with a surface coating of cubic liquid crystalline phase. The droplets can then be collected in bulk in water to disperse the particles and complete their conversion to cubic liquid crystalline gel particles. Alternatively, solvent can be added to the precursor by bubbling vaporized solvent into the precursor. The product of step 1) is a dispersion of cubic liquid crystalline gel particles that can be unstable against aggregation.

The product of step 1) can be stabilized by adding (F) a stabilizer, or by forming a coating of lamellar liquid crystalline phase on the surfaces of the particles. The product of step 1) may also be stabilized by direct dispersion into a viscous aqueous matrix such as a matrix formed by a water-soluble stabilizer such as Carbomer cellulosic polymer. The product of step 2) is a dispersion of colloidally stable cubic liquid crystalline gel particles.

Alternatively, steps 1) and 2) can be combined. Steps 1) and 2) can be combined by adding a stabilizer (F) to a solvent (C) to form a stabilizing composition and thereafter combining the stabilizing composition with the product of step 1).

The precursor can be diluted to form an intermediate such as a dispersion of lamellar liquid crystalline particles, vesicles, or an easily dispersed emulsion. Any of these intermediates can be used to form a colloidally stable dispersion of cubic liquid crystalline gel particles by further dilution in combination with any of the above dispersion and stabilization techniques in steps 1) and 2). This is because the dispersions may be formed and stabilized prior to particle formation. This offers the advantages that intermediates are easier to disperse and stabilize than the potentially more viscous dispersions, and once stabilized, the resulting stabilized intermediates can be diluted to form cubic liquid crystalline gel particles that require no further stabilization.

Cubic gel particles can also be prepared by fragmenting a bulk cubic gel by subjecting the bulk cubic gel to shear in a shear mill, ultrasonication, micromixer dispersal, or membrane emulsification.

Particles can be isolated from a prepared dispersion by removing a sufficient amount of solvent (C) and/or a combination of solvent (C) and hydrotrope (A). The particles may be dried by evaporation or removed from the dispersion by centrifugation, filtration, and combinations thereof.

Methods of Use

Figure 2:
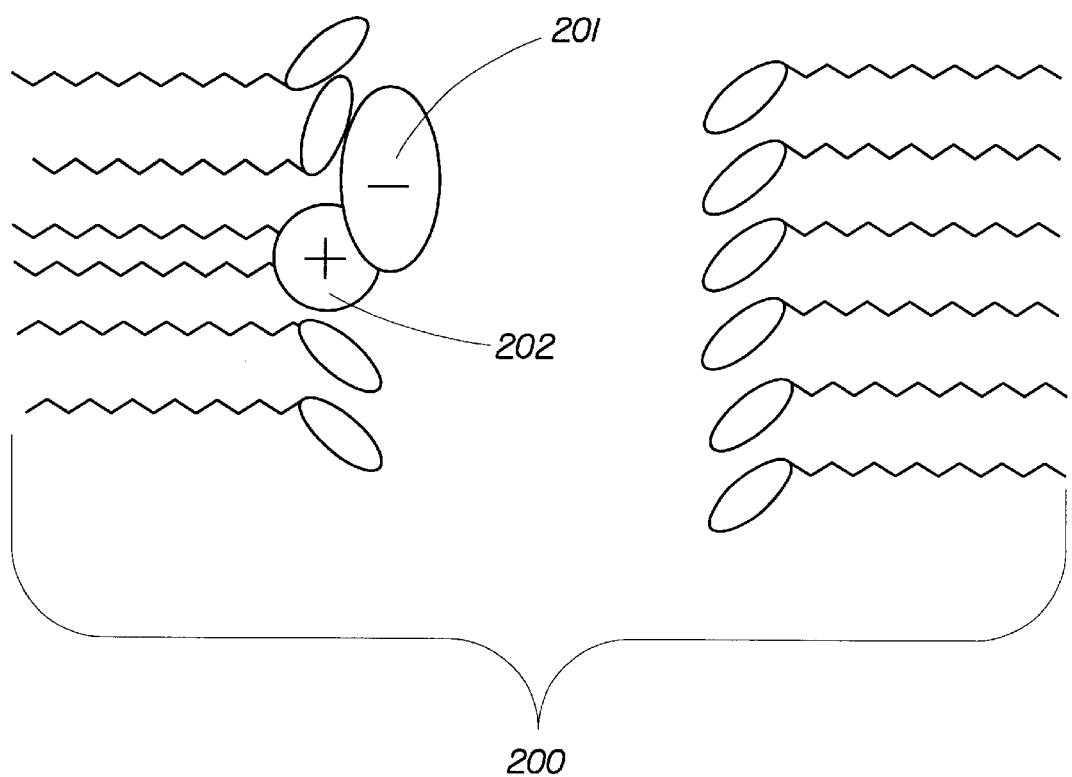
FIG. 2 represents a ketoprofen molecule in a functionalized cubic phase bilayer.

Functionalization with anchors and tethers can provide an ability to modify the interior properties of functionalized cubic liquid crystalline phase materials allowing delivery and controlled release of active ingredients. FIG. 2 illustrates a negatively charged material 201 (e.g., ionized Ketoprofen) anchored into the bicontinuous cubic liquid crystal 200 functionalized with dioctyldecyl dimethyl amine chloride 202 (DODMAC). This interaction can increase the level of loading and enhances the release profile of the material. In one embodiment of the invention, the precursors, gels, dispersions, and particles can be used for topical delivery of pharmaceutical and/or cosmetic active ingredients such as Ketoprofen and those described above.

Precursors, gels, dispersions, and particles can be used for nutrient delivery, encapsulation, stabilization, and/or enzyme delivery, and to generate trans-membrane protein crystal structures. Further, cuboplexes can be fabricated into mini-reactors by attaching an enzyme inside the pores that consume some biological targets, and to remove harmful compounds from their environment, such as heavy metals, which would concentrate in the aggregates and then skimmed off waste water.

Functionalization can offer the added ability to enhance the exterior properties of materials and can help colloidal stability. As a non-limiting example, the exterior of the cuboplexes might be modified with a charge to enhance deposition on substrates. Non-limiting examples of target substrates include skin, hair, fabric, and plant surfaces. It would also be possible to provide selective adhesion of an aggregate to biological sites by affixing an enzymatic protein to the outside of an aggregate with the aggregate containing some pharmaceutical interest. It is believed that affixing large molecules can act as a steric prevention of coalescence generated by attached polymers.

Functionalization offers the further ability to create "on demand" products. "On demand" means that the internal and external properties of a cuboplex release or entrap materials as a consequence of a stimulus. Non-limiting releases or entrapments may be instigated by pH (charged species with a defined pKa), by the addition of salt (reduce the shielding of electrostatics), by the introduction of dielectric solvents (minimize the role of electrostatics), or by the addition or selective removal of components which can selectively bind to the regions.

Preferably, the controlled release delivery of active ingredients, including agrochemicals such as herbicides and pesticides to a substrate such as a plant or insect surface can be performed using the cubic gel precursors by evaporation and/or dilution. Evaporation and/or dilution processes produce "responsive" liquids that provide targeted delivery of active ingredients in response to a stimulus, such as dilution by residual moisture or evaporation as a consequence of spraying. Evaporation and dilution processes may be represented by a line drawn from a starting point to an ending point on the phase diagram.

Dilution

The starting point for a dilution process can be any previously described precursor region on the phase diagram and the ending point can be any region of single-phase cubic liquid crystal or multiple-phase. The trajectory of a dilution path can be determined by a straight line drawn between the starting point and the solvent apex of a ternary phase diagram. Once the starting point is chosen, the ending point should fall along that straight line.

In one exemplary embodiment of the dilution process, a mixture of amphiphile and either an active ingredient with hydrotropic properties or a separate active in combination with a hydrotrope is combined to form an isotropic liquid precursor which is then sprayed onto a substrate coated with solvent. Spraying can disperse the precursor into small droplets that coat the substrate and contact the solvent. Mixing solvent on the substrate with the precursor initiates dilution driving the droplet system into the cubic plus solvent region of the phase diagram, producing a coating of solvent, active ingredient, and cubic liquid crystalline material that slowly releases active into the substrate. Monoglycerides are preferred amphiphiles for plant applications because it is believed that monoglycerides can enhance leaf surface penetration by active ingredients.

Evaporation

The evaporative process can be similar to dilution because the starting point on the ternary phase diagram is also a precursor from which solvent and/or hydrotrope can be evaporated to drive the system to an ending point on the phase diagram in a region of single-phase cubic liquid crystal or multiple-phase (in which at least one phase is cubic liquid crystal). In the case of evaporation, choosing a starting point dictates that the process trajectory will progress toward the amphiphile apex of the phase diagram. The exact path taken can be a function of the vapor pressure of the mixture of the solvent and the hydrotrope, and may not be linear as in the case of dilution. Evaporation may occur during spraying and/or after deposition onto the target substrate.

In one embodiment of the evaporation process, a mixture of amphiphile, hydrotrope, solvent, and active ingredient is combined to form an isotropic liquid precursor which is sprayed onto a substrate. Spraying can disperse the precursor into small droplets, increasing the effective spray area and the ability to evaporate solvent and/or hydrotrope. As the evaporation process progresses, the droplet system rapidly passes into the cubic liquid crystalline regions of the ternary phase diagram, producing a coating of solvent, active, and cubic liquid crystalline material that slowly releases the active into the substrate. Monoglycerides are preferred amphiphile for plant applications because it is believed that monoglycerides can enhance leaf surface penetration by the active ingredients.

EXAMPLES

Determination of Hydrotrope Utility

A compound for use as a hydrotrope is dissolved in water in amounts to form a hydrotrope solution. The solution is added to monoolein (DIMODAN® MO90K) to yield a composition. The composition is left to equilibrate overnight at a temperature of 25 to 30° C. and analyzed by polarized light microscopy (PLM), discussed supra.

Cryo-Transmission Electron Microscopy (Cryo-TEM)

Samples are evaluated to determine whether cubic phase formed by cryo-TEM. For cryo-TEM, the samples are prepared in a controlled environment vitrification system (CEVS), described by Bellare, J. R., Davis, H. T., Scriven, L. E., Talmon, Y., "Controlled environment vitrification technique", *J. Electron Microsc. Tech.,* 1988, 10, 87–111.

Small Angle X-ray Scattering (SAXS)

SAXS patterns are unique for each type of liquid crystal. Therefore, it is an excellent technique to confirm the structure of the liquid crystals. Exemplary SAXS patterns for liquid crystal phases are given in Luzzati, V., Tardieu, A., Gulik-Kryzwicki, T., Rivas, E., Riess-Husson, F., *Nature,* 1968, 220, 485–488. For cubic phase symmetry, a plot of peak position versus $\sqrt{h^2+k^2+l^2}$ generates a straight line having a slope inversely proportional to the lattice parameter confirming the presence of cubic phase liquid crystals. The following are typical reflections for cubic phase symmetry: $P_{n3m}$: [110], [111], [200], [211], [220], and [221]; $I_{a3d}$: [211], [220], [321], [400], [420], and [332].

Example 1

Creating Cuboplex 2.02512 g of monoolein are added to a vial and melted at 40° C. Then, 0.03977 g of stearic acid and 0.08190 g of ethanol are added to the mixture. Finally, 4.71316 g of pH=10 buffer is added to the mixture. The sample is allowed to equilibrate for several hours and is measured by SAXS.

Comparative Example 1

A mixture of 2 grams monoolein, 4.67 grams pH 10 buffer, and 2% sodium stearate is prepared in a vial. The monoolein is melted on a hot plate at 40° C., and the stearic acid is added. Once the stearic acid is completely dissolved, the appropriate amount of buffer is added. The resulting gel is analyzed by x-ray diffraction.

Example 2

A mixture of 2 grams monoolein, 4.67 grams pH 10 buffer, 2% sodium stearate (additive) and 4% ethanol (a hydrotrope) is prepared in a vial. The monoolein is melted on a hot plate at 40° C. and the stearic acid and ethanol are added. Once all components dissolve, pH 10 buffer is added, and the gel is analyzed using x-ray diffraction.

Comparative Example 2

A monoolein-based cubic liquid crystalline phase containing 4% ethanol.

Example 3

A mixture of 2 grams monoolein, 4.67 grams pH 10 buffer, 2% sodium stearate and 4% ethanol (a hydrotrope) is prepared and analyzed as in Comparative Example 2.

Example 4

Di(canola ethylester) Dimethyl Ammonium Chloride (DEDAC) to a monoolein (20% loading of anchors) with active (ketoprofen).

Example 5

A mixture of 0.09510 grams of monoolein and 0.0063 g di(canola ethyl ester) dimethyl amine hydrogen chloride (DEEDAC) were completely dissolved in minimal ethanol. Water was added to dilute the water:ethanol ratio to 95%:5% to provide a dispersion of functionalized cubic liquid crystalline phase.

The goodness of fit data for Examples 2, 3, and 4 above are tabulate in Table 7.

TABLE 7

Goodness of fit data for Examples 2, 3, and 4.

| Sample | Slope | R-value (of fit) | Lattice Parameter (Å) |
|---|---|---|---|
| 4.0% Ethanol | 0.0572 | 0.9999 | 109.8 |
| 4.0% Ethanol + Stearate | 0.050366 | 0.9999 | 124.7 |
| 20% DEDAC + 2% Ketoprofen | 0.0338 | 0.99792 | 185.5 |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A cubic liquid crystalline phase precursor comprising:
   (A) a hydrotrope,
   (B) an amphiphile capable of forming a cubic liquid crystalline phase,
   (C) an optional solvent, and
   (D) an additive selected from the group consisting of an anchor, a tether, and combinations thereof,
   wherein (A), (B), (C), and (D) are present in mass fractions relative to each other such that $$1.0 a+b+c+d$$

wherein a is the mass fraction of (A), b is the mass fraction of (B), c is the mass fraction of (C), and d is the mass fraction of (D), and wherein $1.0>a>0$, $1.0>b>0$, $1.0>c \geq 0$, $1.0>d>0$; and with the proviso that a, b, c, and d do not fall within a cubic liquid crystalline phase region on a phase diagram representing phase behavior of (A), (B), (C), and (D).

2. The precursor of claim 1, wherein (A) is selected from the group consisting of low molecular weight alcohols; polyols; alcohol ethoxylates; surfactants derived from mono- and poly-saccharides; copolymers of ethylene oxide and propylene oxide; fatty acid ethoxylates; sorbitan derivatives; sodium butyrate; nicotinamide; procaine hydrogen chloride; and ethylene glycol, propylene glycol, glycerol, and polyglyceryl esters, and the ethoxylated derivatives thereof; and combinations thereof.

3. The precursor of claim 1, wherein (B) is a monoglyceride having the formula:

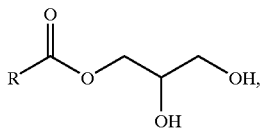

wherein R is selected from the group consisting of monovalent hydrocarbon groups of 6 to 22 carbon atoms, and monovalent halogenated hydrocarbon groups of 6 to 22 carbon atoms.

4. The precursor of claim 1, wherein (D) is an anchor selected from the group consisting of positively charged surfactants, negatively charged surfactants, amphoteric surfactants, lipids of biological origin, and combinations thereof.

5. The precursor of claim 4, wherein said anchor is a positively charged surfactant selected from the group consisting of quaternary surfactants, imidazoline based surfactants, substituted amino acids, and combinations thereof.

6. The precursor of claim 4, wherein said anchor is a negatively charged surfactant selected from the group consisting of alkyl carboxylates, modified carboxylates, isethionates, mono- and di-phosphate esters, alkyl sulphates, sulphonates, alkyl sulphonates, olefin sulphonates, alkyl benzene sulphonates, sulphosuccinates, and combinations thereof.

7. The precursor of claim 4, wherein said anchor is an amphoteric surfactant selected from the group consisting of betaines, glycinates, amino propionates, and combinations thereof.

8. The precursor of claim 4, wherein said anchor is a lipid of biological origin selected from the group consisting of fatty acids, acyl glycerols, glycerolphospholipids, spingolipids, steroids, sugar-based surfacatants, and combinations thereof.

9. The precursor of claim 1, wherein (D) is a tether selected from the group consisting of derivatized polysaccharides, linear substituted polymers, star polymers, polypeptides, and polynucleotides, and combinations thereof.

10. The precursor of claim 9, wherein said tether is a derivatized polysaccharide selected from the group consisting of cellulose derivatives, chitin derivatives, starch derivatives, glycogen, glycoaminoglycans, glycoproteins, lignan based polymers, and combinations thereof.

11. The precursor of claim 9, wherein said tether is a linear substituted polymer selected from the group consisting of vinyl polymers, polyamines, polyamides, polyesters, polyphosphates, polysiloxanes, polycarbonates, polyethoxylates, and combinations thereof.

12. The precursor of claim 9, wherein said tether is a polypeptide selected from the group consisting of polylysine, lipoproteins, and combinations thereof.

13. The precursor of claim 1, wherein (C) is present, and wherein (D) is selected from the group consisting of polar and nonpolar solvents.

14. The precursor of claim 1, further comprising (E) an active ingredient.

15. The precursor of claim 1, wherein (C) is present.

16. A method for preparing the cubic liquid crystalline phase precursor of claim 1 comprising the steps of:
   1) combining (B) an amphiphile capable of forming a cubic liquid crystalline phase with (A) a hydrotrope,
   2) adding (D) an additive selected from the group consisting of an anchor, a tether, and combinations thereof, and
   3) optionally adding (C) a solvent;
   wherein ingredients (A), (B), (C), and (D) are present in mass fractions relative to each other such that $$1.0 = a+b+c+d$$

wherein a is the mass fraction of ingredient (A), b is the mass fraction of ingredient (B), c is the mass fraction of ingredient (C), and d is the mass fraction of ingredient (D), and wherein $1.0a>0$, $1.0>b>0$, $1.0>c \leq 0$, $1.0>d>0$; and with the proviso that a, b, c, and d do not fall within a cubic liquid crystalline phase region on a phase diagram representing phase behavior of ingredient (A), (B), (C), and (D), and with the proviso that amounts of each ingredient in the composition are such that a cubic liquid crystalline phase forms upon occurrence of a stimulus.

17. A bulk cubic liquid crystalline gel comprising:
   (A) a hydrotrope,
   (B) an amphiphile capable of forming a cubic liquid crystalline phase,
   (C) a solvent, and
   (D) an additive selected from the group consisting of an anchor, a tether, and combinations thereof, wherein ingredients (A), (B), (C), and (D) are present in mass fractions relative to each other such that $$1.0 = a+b+c+d$$

wherein a is the mass fraction of ingredient (A), b is the mass fraction of ingredient (B), c is the mass fraction of ingredient (C), and d is the mass fraction of ingredient (D), and wherein 1.0>a>0, 1.0>b>0, 1.0>c>0, 1.0>d>0; and with the proviso that a, b, c, and d fall within a cubic liquid crystalline phase region on a phase diagram representing phase behavior of ingredients (A), (B), (C), and (D).

18. The gel of claim 17, further comprising (E) an active ingredient.

19. A disperison of cubic liquid crystalline gel particles comprising:
(A) a hydrotrope,
(B) an amphiphile capable of forming a cubic liquid crystalline phase,
(C) a solvent, and
(D) an additive selected from the group consisting of an anchor, a tether, and combinations thereof,
wherein ingredients (A), (B), (C), and (D) are present in mass fractions relative to each other such that $$1.0 = a+b+c+d$$

wherein a is the mass fraction of ingredient (A), b is the mass fraction of ingredient (B), c is the mass fraction of ingredient (C), and d is the mass fraction of ingredient (D), and wherein 1.0>a>0, 1.0>b>0, 1.0>c>0, 1.0>d>0; and with the proviso that a, b, c, and d fall within a region representing cubic liquid crystalline phase in combination with at least one other phase on a phase diagram representing phase behavior of ingredients (A), (B), (C), and (D), with the proviso that the dispersion has a form of functionalized cubic liquid crystalline gel particles dispersed in the other phase.

20. The dispersion of claim 19, further comprising (E) an active ingredient.

* * * * *

UNITED STATES PATENT AND TRADEMARK OFFICE
CERTIFICATE OF CORRECTION

PATENT NO. : 6,656,385 B2
DATED : December 2, 2003
INVENTOR(S) : Lynch, Matthew L. and Spicer, Patrick T.

It is certified that error appears in the above-identified patent and that said Letters Patent is hereby corrected as shown below:

Column 17,
Line 20, please change "1.0a+b+c+d" to -- 1.0 = a+b+c+d --

Column 18,
Line 52, please change "1.0a>0" to -- 1.0 > a > 0 --

Signed and Sealed this

Twenty-ninth Day of June, 2004

JON W. DUDAS
*Acting Director of the United States Patent and Trademark Office*